United States Patent [19]

Saleem et al.

[11] 3,907,526

[45] Sept. 23, 1975

[54] HIGH VELOCITY SPRAY SCRUBBER

[75] Inventors: Abdus Saleem, Oakville, Canada; Robert Kopita, Fanwood, N.J.

[73] Assignee: Peabody Engineering Corporation, Stamford, Conn.

[22] Filed: Apr. 30, 1973

[21] Appl. No.: 355,928

[52] U.S. Cl. .......................... 55/223; 55/73; 55/94; 55/233; 423/242
[51] Int. Cl.² ........................................ B01D 47/00
[58] Field of Search ............. 23/283; 55/73, 89, 93, 55/94, 223, 228, 229, 257; 423/242; 261/115–117

[56] References Cited
UNITED STATES PATENTS

| | | | |
|---|---|---|---|
| 2,247,897 | 7/1941 | Wahlin | 239/468 |
| 3,370,402 | 2/1968 | Nakai et al. | 55/94 |
| 3,395,193 | 7/1962 | Bruce et al. | 55/94 |
| 3,456,709 | 7/1969 | Vegby | 55/257 |
| 3,631,656 | 1/1972 | Hausberg | 55/257 |
| 3,687,613 | 8/1972 | Rickard | 55/73 |
| 3,795,486 | 3/1974 | Ekman | 55/73 |

OTHER PUBLICATIONS

Flue Gas Desulfurization, Joy Manufacturing Company, June 1972.

Primary Examiner—Charles N. Hart
Attorney, Agent, or Firm—Hubbell, Cohen, and Stiefel

[57] ABSTRACT

Flue gas containing sulphur dioxide is moved upwardly through an unobstructed scrubber space while a scrubber liquor is sprayed downwardly into the space from a plurality of at least four vertically spaced spray heads. The relative velocity between the scrubber liquor and the gas is at least about 600 feet per minute. Means are provided above the uppermost spray head for removing entrained liquor droplets and dust particles from the rapidly upwardly moving scrubber flue gas. This means may include a wash tray having clear water passing over the top thereof and a spray head for spraying water at the bottom thereof to prevent the formation of deposits thereon. In lieu of the wash tray the scrubber may be widened above the scrubber space to slow the velocity of the flue gas whereby to cause entrained liquor droplets and dust particles to fall out of the gas. In this latter embodiment water sprays may be directed at the widened portion of the scrubber tower to prevent the formation of deposits. Disposed between the liquor droplet and dust particle removal means and the outlet for the scrubber is a mist eliminator.

6 Claims, 6 Drawing Figures

HIGH VELOCITY SPRAY SCRUBBER

BACKGROUND OF THE INVENTION

1. Field of the Invention

This invention relates to spray scrubbers and particularly to spray scrubbers utilizing a mother liquor in slurry form. Most particularly this invention relates to spray scrubbers utilizing mother liquor in slurry form wherein the relative velocity between the sprayed mother liquor and the gas being scrubbed is at least about 600 feet per minute. Most particularly this invention relates to a spray scrubber for removing sulfur dioxide from flue gas wherein a limestone slurry is employed as the mother liquor.

2. Description of the Prior Art

Spray scrubbers have been known for many years. It has been generally believed that scrubbing efficiency is a function of surface area so that in prior art spray scrubbers efforts have been made to have the particle size of the size of droplets of sprayed liquor very fine whereby to increase the surface area of contact between the liquor and the upwardly gas being scrubbed.

In a paper delivered by the inventor along with D. Harrison and N. Sekher at the Second International Lime/Limestone Wet Scrubbing Symposium, held in New Orleans from November 8 to Nov. 12, 1971, which paper has been reprinted by the U.S. Environmental Protection Agency in its publication No. APTD 1161, a new type of high velocity scrubber was disclosed wherein the relative velocity between the upwardly moving gas and the downwardly moving sprayed scrubber liquor was about 600 feet per minute. The use of such high relative velocities, dependent principally on the upward velocity of the flue gas being scrubbed, resulted in the need for much larger diameter scrubber liquor droplets than heretofore employed in order to prevent a signficant portion of the scrubber liquor from being carried off with the rapidly upwardly moving flue gas. Notwithstanding the increase in droplet size to accommodate to the rapidly moving gas, it has been found that the scrubber action is improved as a result of the high relative velocity between the gas and the droplets.

However, further experimentation with the system in the aforementioned paper has established that there is a marked tendency in such high velocity scrubbers for significant amounts of entrained fine droplets of scrubber liquor as well as dust particles in the gas being scrubbed to remain with the gas and move upwardly through the scrubber space and out through the stack, which naturally is undesirable. The present application relates to means for overcoming this problem and to thus yield a high velocity high capacity spray scrubber in which the scrubbed gas passing out therefrom has low scrubber liquor and dust particle content and low content of the contaminant being removed by the scrubber liquor.

SUMMARY OF THE INVENTION

An unobstructed scrubber space is defined by an upwardly extending peripherally continuous sidewall, preferably cylindrical, having an inlet near the bottom and an outlet at the top. Disposed in the scrubber space above the inlet are a plurality of vertically spaced nozzles, preferably at least four in number, all of which are downwardly directed and preferably disposed along the longitudinal axis of the scrubber. The nozzles are preferably of the hollow cone type which introduces a spray having comparatively large droplet size, the average droplet being of the order of 3,000 microns in diameter. At the bottom of the scrubber is a conical section with an outlet pipe going to a recirculation tank. The hollow cone nozzles are fed scrubber liquor from the recirculation tank. The gas being scrubbed, for example a flue gas from a furnace, is introduced into the inlet at the bottom of the scrubber and is caused to move upwardly at a relatively high velocity, preferably not less than about 600 feet per minute relative to the downwardly moving droplets of scrubber liquor therewithin.

Disposed above the uppermost nozzle for introducing mother liquor into the scrubber space is a means for removing entrained droplets of scrubber liquor and dust particles from the scrubbed gas. This means may take any of several forms, preferably the form of a wash tray which is included not for absorbing additional contaminant from the flue gas, but for removing said liquor droplets, dust particles and other particulate material entrained in the upwardly moving gas as it moves through the wash tray. The wash tray is washed preferably with clear water, and a portion of the water utilized to flow over the upper surface of the wash tray is reintroduced through an upwardly directed spray nozzle beneath the wash tray to wash the bottom of the wash tray to prevent the formation of mineral deposits on the wash tray. Disposed above the wash tray is a conventional mist eliminator for removing entrained droplets of spray liquor prior to the exiting of the scrubbed gas from the scrubber.

In lieu of the wash tray, the entrained mother liquor droplets and dust particles can be removed by shaping the peripheral sidewall so that the cross section of the scrubber tower above the scrubber space is greatly enlarged whereby to slow down the average velocity of the flue gas moving therethrough to thereby cause entrained droplets and dust particles to drop out of the gas and against the side wall. Water sprays may be provided to wash the deposited material off the wall and down to the collector at the bottom of the scrubber.

DESCRIPTION OF PREFERRED EMBODIMENTS

Figure 1:
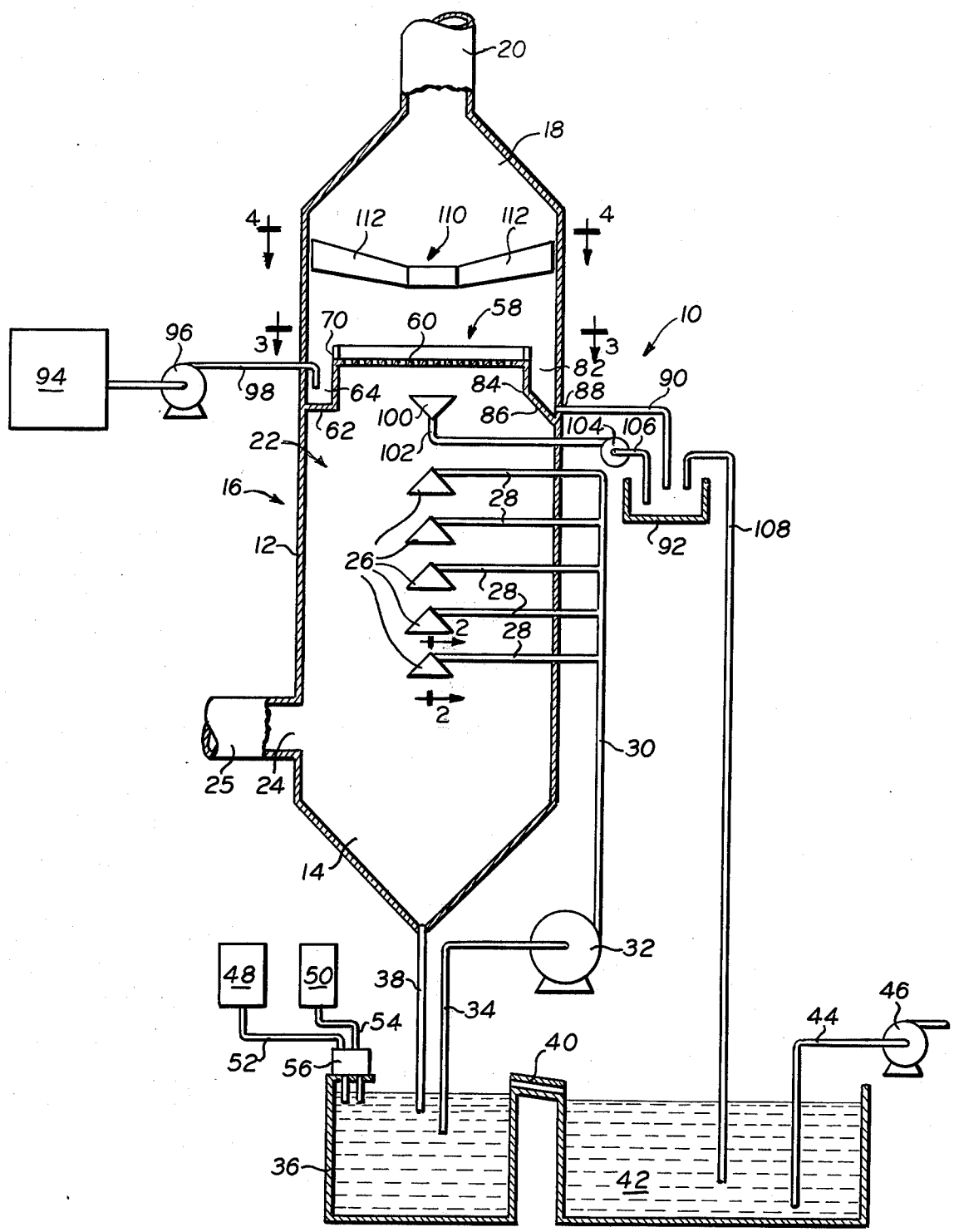
FIG. 1 is a vertical sectional view, partially schematic, of a spray scrubber in accordance with the present invention.

Referring now to the drawings in detail, the scrubber 10 of the present invention comprises a vertically extending peripheral sidewall 12, preferably cylindrical in configuration, having a conical lower collector portion 14, a cylindrical section 16 thereabove, and a frusto-conical upper section 18 leading to an outlet 20. The lower portion of the cylindrical section 16 forms the scrubber section 22 having a transversely extending inlet 24 at the bottom thereof. As is well known to those skilled in the scrubber art, the gas to be scrubbed, for instance a flue gas from a furnace, is introduced through the inlet 24 by a duct 25 and flows upwardly through the scrubber section 22 and the conical section 18 and out through the outlet 20.

As the gas to be scrubbed moves through the scrubber section it moves past a plurality, here shown as five in number and preferably not fewer than four in number, of downwardly directed nozzles 26 which are connected by branch pipes 28 to a manifold 30 that is connected to the outlet of a scrubber liquor pump 32, the inlet of which is connected through a pipe 34 to a recirculating tank 36. Assuming scrubber liquor in the recirculating tank, it will be obvious that with the pump 32 functioning, as the flue gas moves upwardly through the scrubber section 16 it will move through a shower of sprayed scrubber liquor droplets for reaction therewith.

Preferably, the relative velocity of the upwardly moving flue gas and the downwardly moving droplets introduced by the spray nozzles 26 is at least about 600 feet per minute. Assuming this to be the case, the droplet size of the liquor spray introduced by the nozzles 26 must be quite large or else the droplets will be carried upwardly by the rapidly moving gas and out through the scrubber outlet 20. This, of course, would defeat the recirculation feature of the scrubber 10 and would also cause a significant environmental problem. Accordingly, it is preferred that the nozzles 26 be of such a type that the droplets sprayed therefrom have a minimum median droplet diameter of about 2,000 microns and a minimum diameter of about 500 microns. Preferably, assuming the gas moving upwardly through the scrubber section is moving at about 600 feet per minute, it is preferred that the median droplet diameter of the spary introduced by the nozzles 26 be about 3,000 microns. A spray nozzle which will produce a spray of the desired type is the hollow cone nozzle manufactured by Spraying Systems Co. under the designation Whirljet Nozzle which nozzle is made in accordance with the teachings of U.S. Pat. No. 2,247,897, hereby incorporated by reference.

As may best be seen from FIG. 1, after the sprayed scrubber liquor passes through the scrubber space 22, it falls into the collector section 14 and thence by gravity through an outlet pipe 38 to the collector tank 36. While a number of manners of handling the scrubber liquor in the recirculating tank 36 may be employed in accordance with well known prior art procedures, the handling of such scrubber liquor forms no part of the present invention. Thus for illustrative purposes, I have shown in FIG. 1 that the recirculating tank 36 is connected by means of an overflow conduit 40 to a clarifier 42 which in turn is connected by an inlet pipe 44 to a waste slurry pump 46 for removing waste slurry. To maintain the composition of the scrubber liquor correctly, a source of reagent 48 and of clear liquid such as water 50 are connected to the recirculation tank 46 by pipes 52 and 54, respectively, which are controlled by suitable control apparatus 56. This maintains the composition of the scrubber liquor as desired for the intended result.

In utilizing the spary scrubber as above described with the high velocity gas moving therethrough, a pronounced tendency for the gas to carry with it through the scrubber section 16 and out through the outlet 20 entrained droplets of mother liquor as well as dust particles and other particulates has presented a serious environmental problem in utilizing the desirable high velocity scrubber. This is true even though an effort is made to keep droplets at a minimum diameter of about 500 microns, for there will always be some sprayed droplets below this desired minimum diameter. Moreover, impacts of droplets causes their division into smaller droplets. Thus, it will understood that when a minimum droplet diameter of 500 microns is specified, there will generally be some small fraction of droplets smaller than the diameter in the spray. Thus, while large volumes of furnace flue gas can be treated in such a scrubber to remove, for example, sulfur dioxide, the marked tendency to have the small droplets and fine dust particles remain entrained in the gas has limited the utility of such a high velocity scrubber.

Figure 3:
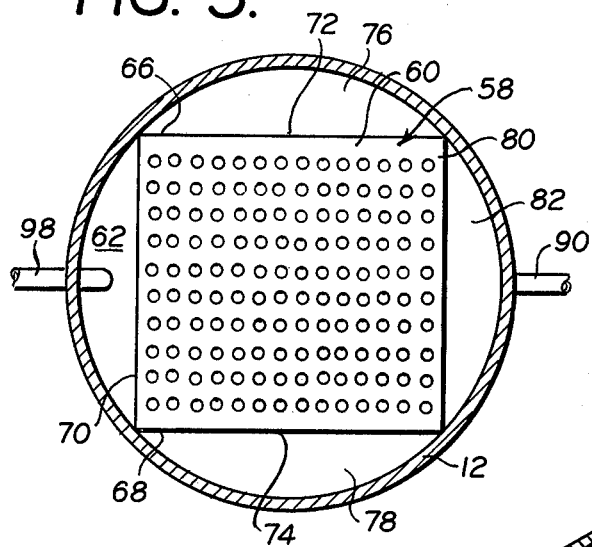
FIG. 3 is a sectional view taken along the line 3—3 of FIG. 1 and showing a wash tray for absorbing entrained fly ash.
Figure 5:
FIG. 5 is a fragmentary sectional view taken along the line 5—5 of FIG. 4.
Figure 4:
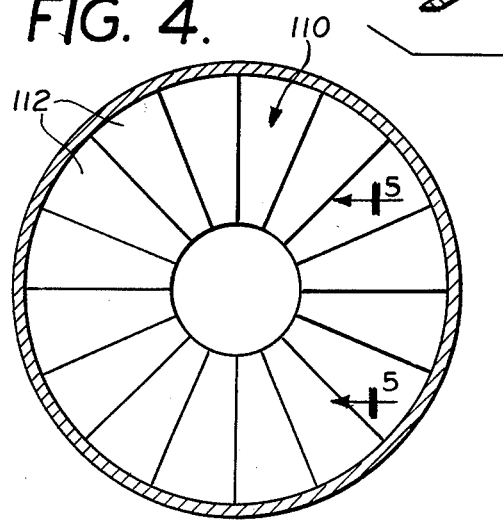
FIG. 4 is a sectional view taken along the line 4—4 of FIG. 1 and showing a mist eliminator.

In accordance with the present invention means are provided above the scrubber section 22 for removing entrained particulates from the gas. As shown in FIGS. 1 and 3, this means may be a wash tray 58 comprising a rectangular central section 60 bounded on the inlet side by a baffle plate 62 having a trough 64 disposed therein which trough is further defined by a pair of opposed sidewalls 66 and 68 as well as a wall 70 defining a weir over which water may flow. Extending along the sides of the perforated section 60 of the wash tray 58 are a pair of sidewalls 72 and 74 for limiting water flowing over the wash tray to section 60, which walls are joined through side baffles 76 and 78, respectively, to peripheral sidewall 12 to prevent the scrubbed gas from passing around the perforated section 60 of the wash tray 58. At the outlet end 80 of the section 60 there is a trough 82 defined partly by the peripheral sidewall 12 and partly by a wall 84 that extends vertically downwardly and then converges with the peripheral sidewall by the converging section 86. At the bottom of trough 82 there is an outlet 88 connected to a pipe 90 which runs to a water collector tank 92. As shown the water collector tank is elevated. If the elevated location for tank 92 is employed, then clearly some means, such as suitable brackets and braces, must be employed for supporting it in its raised position, which means are not shown but which means will be obvious to anyone skilled in the art.

Water from any suitable source such as a tank 94 may be pumped by a pump 96 through a pipe 98 and into the trough 64. When the level of the water in the trough exceeds the height of the weir defined by the wall 70, water will flow over the weir and across the perforated section 60 and then into the trough 82 and out through the pipe 90. As is well known in the art of wash trays, the perforations in the perforated section 60 are proportioned so that the upward force of the flue gas moving through the scrubber section will prevent the water from dropping through the perforations. Instead, the gas will percolate through the water film overlying the perforated section and the particulate material entrained in the gas will be picked up by the water flowing over the perforated section and hence removed from the gas prior to its passage out through the outlet 20.

In this connection it is recognized that wash trays have heretofore been employed as scrubbing elements. However, in the present invention, the wash tray is not included to remove the chemical contaminant, such as SO₂, from the flue gas and the liquid employed with the wash tray is preferably plain water. The chemical contaminant, such as sulfur dioxide, is removed by the scrubber liquor sprayed into the scrubber space by the nozzles 26. The purpose of the wash tray is solely to remove fine droplets and dust particles and for that reason clear water may be employed. While there may be some small removal of sulfur dioxide by the wash tray this is merely incidental to the main function of the wash tray in the present scrubber.

In accordance with another feature of the present invention means are included for preventing the formation of mineral deposits on the wash tray 58 which mineral would eventually lead to a clogging of the wash tray and a shutting down of the scrubber 10. This means includes an upwardly directed spray nozzle 100 which is connected to a pipe 102 that extends from a pump 104 having an inlet pipe 106 disposed in the tank 92 into which the wash water from the upper surface of the wash tray flows. A portion of the waste wash water is pumped by the pump 104 from the tank 92 to the spray nozzle 100 which directs a fine spray at the under surface of the wash tray 58 which spray washes any mineral deposits accumulating thereon off the tray and down though the scrubber space, generally along the inner surface of the wall 12 and into the collector 14. The remainder of the waste wash water collected in the tank 92 flows by means of an overflow pipe 108 into the clarifier 42.

As is customary in spary scrubbers a mist eliminator 110 is interposed between the scrubbing section 22 and the outlet 20, preferably above the wash tray 58, for removing any entrained particles of liquid from the scrubbed gas prior to its moving out through the outlet 20. As shown herein and is well known to those in the art, the mist eliminator 110 is made of a plurality of blades of veins 112 each of which is radially extending and bent upwardly whereby to impart to the exiting flue gas a swirling movement as it passes through the mist eliminator. Entrained droplets of scrubber liquor tend to move toward wall 12 by centrifugal force where they are deposited. Ultimately they flow down the wall 12 and into the collector 14.

As previously indicated, a scrubber of the type described is especially desirable for use where the scrubber liquor is in the form of a slurry. Thus, for example, in an experimental use of a scrubber of the type described for the removal of sulfur dioxide from the flue gas of a furnace, an aqueous slurry of limestones has been employed as the scrubber liquor. Preferably the slurry contains between about 10 and 25 percent solids, the balance being water. A limestone slurry normally contains $CaCO_3$, $CaSO_3 \cdot 1/2H_2O$, $CaSO_4 \cdot 2H_2O$, and possibly dust particles. The preferred ranges of these components are about as follows:

| | |
|---|---|
| $CaCO_3$ | 1 – 5% |
| $CaSO_3 \cdot 1/2H_2O$ | 4 – 11% |
| $CaSO_4 \cdot 2H_2O$ | 1 – 5% |
| Dust Particles | 0 – 10% |

By maintaining the pH of the slurry in the recirculation tank at about 5.8 through operation of the water-limestone seed control mechanisms, the consumption of limestone can be held to from about 1.2 to 1.3 the stoichiometric amount required for the reaction with SO₂.

Thus in the particular experimental use of the scrubber, the following slurry compositions have been employed successfully:

Typical compositions of slurry being sprayed.

| Constituent | % by wt. of slurry | | | |
|---|---|---|---|---|
| $CaCO_3$ | 4 | 1 | 2.3 | 3.0 |
| $CaSO_3 \cdot 1/2H_2O$ | 8 | 10 | 4.8 | 6.4 |
| $CaSO_4 \cdot 2H_2O$ | 3 | 4 | 1.6 | 2.2 |
| Dust Particles | — | — | 6.3 | 8.4 |
| Total solids | 15 | 15 | 15 | 20 |
| Total water | 85 | 85 | 85 | 80 |

Figure 2:
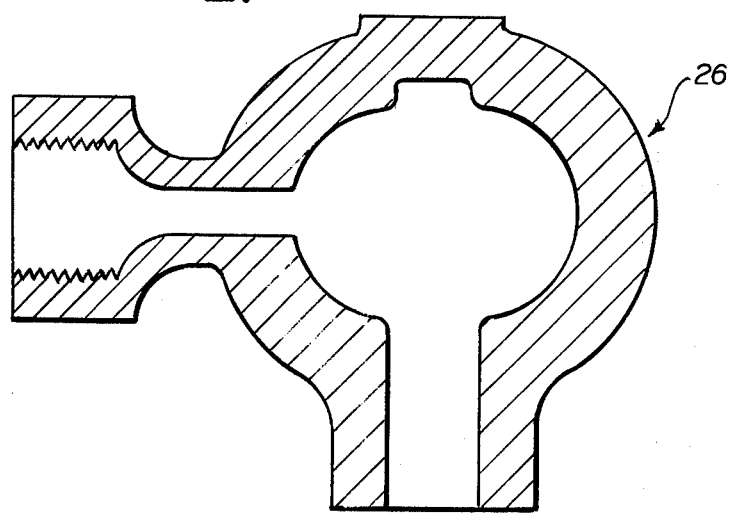
FIG. 2 is a sectional view taken along the line 2—2 of FIG. 1 and showing a suitable nozzle for introducing a slurry scrubber liquor into the scrubber space.

In the experimental device heretofore operated, the scrubber space 22 is of cylindrical configuration having a cross sectional area of about 5 sq. ft. The lower most spray nozzle 26 is disposed approximately 3 ft. above the inlet 24 and the remaining 4 spray heads 26 were each spaced apart along the central axis of the scrubber at 3 ft. intervals. Approximately 3,800 cu. ft. per minute of flue gas at a temperature of about 260°F was introduced into the scrubber through the inlet 24 and about 3,000 cu. ft. per minute of scrubbed gas at 110°F exited through the outlet 20. Approximately 240 gal. per minute of scrubber liquor was passed through the nozzles 26, each spraying a substantially equal amount (approximately 48 gpm), and the spray heads were of the hollow cone nozzle type previously mentioned and illustrated in FIG. 2 with one inch orifices. The perforated portion 60 of the wash tray 58 was about 3.2 sq. ft. in area with about 3,250 holes having a diameter of about 3/16 inch and a pitch of about ⅞ inch. About 3 gal. per minute of clear water was introduced into the inlet trough 64. This maintained a water film on the wash tray of about an inch in thickness. Approximately 1 gal. per minute was taken from the trough 92 to be sprayed through the spray head 100 at the bottom of the wash tray. The remainder of the wash water used in the wash tray flowed through the pipe 108 to the clarifier 42. Utilizing such a scrubber with such scrubbing liquors sulfur dioxide removal from the gas entering the scrubber has been of the order of about 80 percent.

Figure 6:
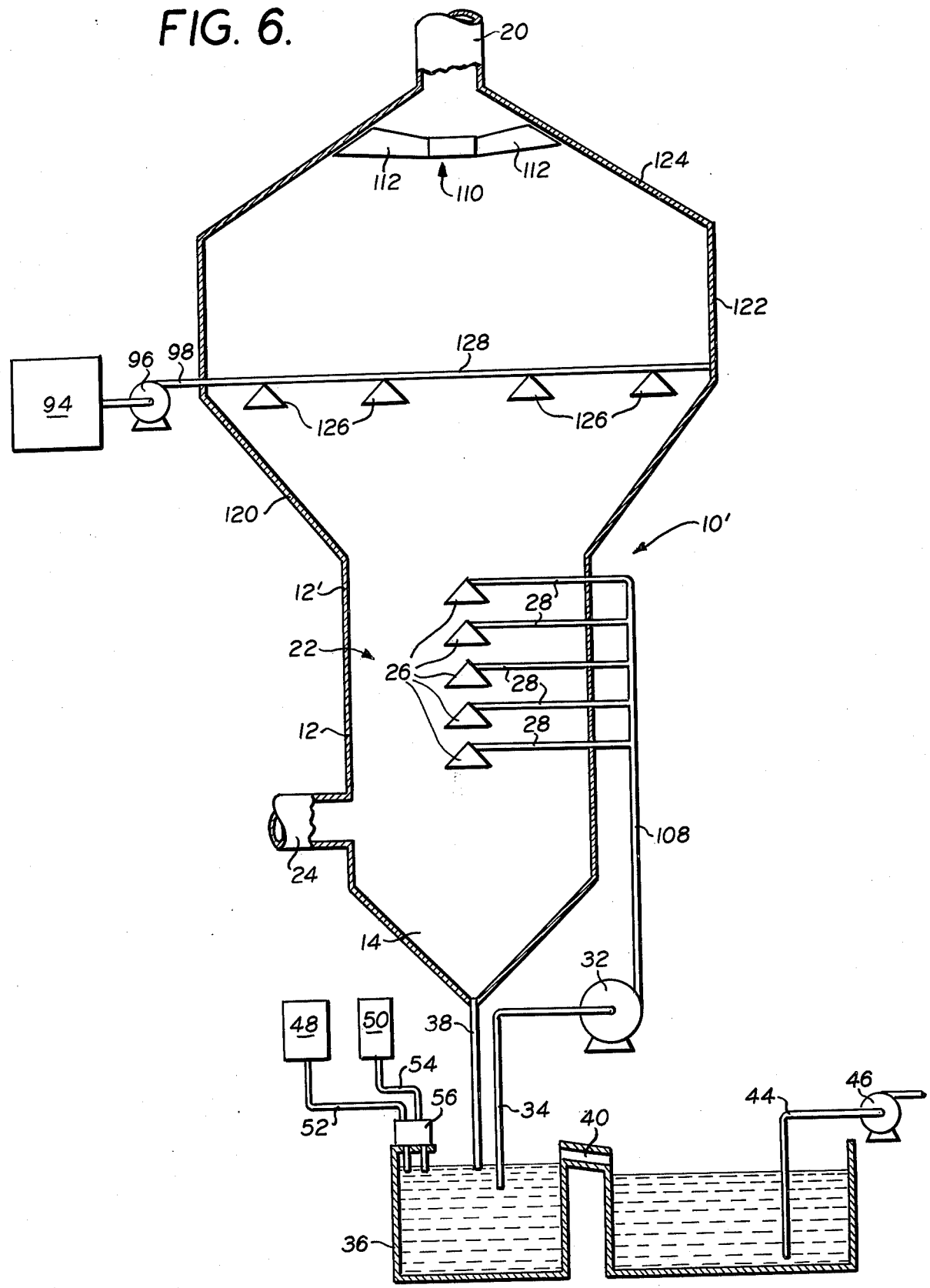
FIG. 6 is a view similar to FIG. 1 showing an alternate embodiment of the present invention.

Other means for removing particulates such as liquor droplets and dust particles from the scrub gas may be employed in lieu of the wash tray 58 of FIGS. 1 and 3. Such a modification is shown in FIG. 6 wherein corresponding reference numerals relate to corresponding parts of the drawing of FIG. 1. However, the peripheral side wall 12' of the scrubber 10' of FIG. 6 is provided with an outwardly flaring frusto-conical portion 120 that communicates at its lower end with the scrubber section 22 of scrubber 10' which flares outwardly to a greatly enlarged cylindrical cross section portion 122 of an area of about 10 sq. ft. that extends upwardly and thence finally to an inwardly converging upwardly extending frusto-conical portion 124 that communicates at its upper end with outlet 20 of the scrubber. The mist eliminator 110 is disposed at the upper of the frusto-conical portion 124. It functions in the same manner as the mist eliminator 110 of FIG. 1.

By providing a zone of greatly enlarged cross sectional area in the scrubber 10', the velocity of the gas flowing through the enlarged cross sectional portion will be greatly diminished and will be insufficient for maintaining entrained a large portion of the particulate material theretofore carried by the rapidly upwardly moving scrubbed gas. Thus a large fraction of the particulate material will fall out of the upwardly moving gas under the influence of gravity and will settle on the frusto-conical portion 120 of the scrubber wall 12'. A plurality of spray heads 126 connected to an annular pipe or manifold 128 which is fed by the outlet 98 from a pump 96 may be included to spray clear water against the frusto-conical portion 120 whereby to wash the deposited particulates off the frusto-conical portion and along the wall 12' to the collector 14. At the same time, the water spray eminating from the nozzle 126 will serve to remove any mineral deposits which may form on the frusto-conical portion 120 whereby to keep the scrubber clean and operative. While the embodiment illustrated in FIG. 6 has not as yet been constructed it is believed clear that its effectiveness in removing sulfur dioxide will be comparable to the effectiveness of the FIG. 1 embodiment. Moveover, if it is desired to greatly increase the upward velocity of the gas to be scrubbed, the means for removing particulates employed in the FIG. 6 embodiment may prove more effective than the wash tray being shown in FIG. 1.

While the specific examples, for the scrubber of the present application have been given with respect to removal of sulfur dioxide and fly ash from flue gas, it will obvious to those skilled in the art that the present invention may be employed for a wide variety of scrubbing applications, especially where the scrubbing liquor is a slurry.

While I have herein shown and described the preferred form of the present invention and have suggested modifications thereof, other changes and modifications may be made therein within the scope of the appended claims without departing from the spirit and scope of this invention.

We claim:

1. In a scrubber comprising:

a peripherally continuous upwardly extending wall defining a substantially unobstructed scrubbing space therewithin, said wall having an inlet below said scrubbing space and an outlet thereabove;

a plurality of vertically spaced downwardly directed nozzles in said scrubber space, said nozzles being constructed to spray into said scrubber space droplets of scrubber liquor having a minimum diameter of about 500 microns;

means for introducing gas to be scrubbed through said inlet and means for feeding scrubbing liquor to said nozzles, the relative velocity between the upwardly moving gas in said scrubbing space and said downwardly moving droplets of scrubber liquor being not less than about 600 feet per minute;

the improvement which comprises a wash tray disposed between the upper end of said scrubbing space and said outlet, means for flowing a layer of water over the upper surface of said wash tray for removing entrained droplets and particulates from said gas, an upwardly directed spray head disposed beneath said wash tray, and means for supplying water to said upwardly directed spray head for spraying said water onto the underside of said wash tray, whereby to prevent the formulation of mineral deposits on the bottom of said wash tray.

2. The scrubber of claim 1, wherein said nozzles are constructed so that the median droplet diameter is at least about 2,000 microns.

3. The scrubber of claim 1, wherein said nozzles are constructed so that the median droplet diameter is about 3,000 microns.

4. The scrubber of claim 1, further comprising a mist eliminator disposed between said means for receiving entrained solids and said outlet.

5. The scrubber of claim 4, wherein said nozzles are constructed so that the median droplet diameter is at least about 2,000 microns.

6. The scrubber of claim 1, wherein said means for supplying water to said upwardly directed spray head comprises a tank, and means for supplying water to said tank after it has flowed over the upper surface of said wash tray.

* * * * *

PO-1050
(5/69)

UNITED STATES PATENT OFFICE
CERTIFICATE OF CORRECTION

Patent No. 3,907,526         Dated September 23, 1975

Inventor(s) Abdus Saleem and Robert Kopita

It is certified that error appears in the above-identified patent and that said Letters Patent are hereby corrected as shown below:

Column 6, line 36, "7/8" should read --3/8--.

Signed and Sealed this sixth Day of January 1976

[SEAL]

Attest:

RUTH C. MASON
*Attesting Officer*

C. MARSHALL DANN
*Commissioner of Patents and Trademarks*